United States Patent [19]

Glasser et al.

[11] Patent Number: 5,523,398

[45] Date of Patent: Jun. 4, 1996

[54] CELLULOSE DERIVATIVES WITH A LOW DEGREE OF SUBSTITUTION

[75] Inventors: Wolfgang G. Glasser; Gamini Samaranayake, both of Blacksburg; James E. Sealey, II, Deltaville, all of Va.

[73] Assignees: The Center for Innovative Technology, Herndon; Virginia Polytechnic Institute and State University; Virginia Tech Intellectual Properties, both of Blacksburg, all of Va.

[21] Appl. No.: 296,934

[22] Filed: Aug. 31, 1994

[51] Int. Cl.$^6$ .............................. C08B 3/00; C08B 5/00; C08B 7/00
[52] U.S. Cl. .............................. 536/58; 536/63; 536/64; 536/115; 536/119; 536/124
[58] Field of Search .............................. 536/58, 63, 64, 536/115, 119, 124

[56] References Cited

U.S. PATENT DOCUMENTS

| | | | |
|---|---|---|---|
| 4,307,229 | 12/1981 | Liav et al. | 536/119 |
| 4,316,983 | 2/1982 | Bollag et al. | 536/4 |
| 4,983,670 | 1/1991 | Yates et al. | 536/58 |

*Primary Examiner*—Nathan M. Nutter
*Attorney, Agent, or Firm*—Whitham, Curtis, Whitham & McGinn

[57] ABSTRACT

The invention is directed to the formation of cellulose derivatives using homogenous phase reaction conditions. Cellulose is dissolved using DMAc/LiCl and a reagent system is added to promote the acylation of an appropriate acid anhydride or free carboxylic acid. One reagent system includes N,N-dicyclohexylcarbodiimide (DCC) and 4-pyrrolidinopyridine (PP). Another reagent system includes p-toluene sulfonyl chloride (TsCl) and pyridine (Py).

20 Claims, No Drawings

CELLULOSE DERIVATIVES WITH A LOW DEGREE OF SUBSTITUTION

BACKGROUND OF THE INVENTION

1. Field of the Invention

The invention is directed to cellulose derivatives that have a low degree of substitution and a uniform degree of modification along the polymer backbone. The invention is particularly directed to an acylation process for producing the cellulose derivatives.

2. Description of the Prior Art

The chemical modification of cellulose, with esterifying and etherifying agents, represents a widely practiced industrial technology worldwide. Both cellulose ethers and cellulose esters have reached significant commercial importance. All commercially available cellulose derivatives are made by heterogenous reaction. Malm et al., *Ind. Eng. Chem.*, 43(3), 688–91 (1951) discloses two phase reaction chemistry in which cellulose remains suspended in a solution of a reagent in water or a solvent. The cellulose reacts gradually in a stepwise fashion beginning with the amorphous regions and proceeding to the crystalline regions. Uryash et al., *Thermochim. Acta*, 93:409–412 (1985), reported that cellulosic materials made using the two-stage reaction chemistry have a "blocky" character where neighboring sections can be unsubstituted or have a high degree of substitution or modification, depending on the accessibility.

The practice of heterogenous reaction chemistry in connection with cellulose esters has resulted in products with a high degree of substitution, usually above 2.4. This means that on average, 2.4 of the hydroxy groups per sugar molecule in the cellulose backbone are esterified. Highly esterified cellulose materials have good solubility, improved thermal properties, and improved processability. However, cellulose esters with a high degree of substitution have reduced biodegradability, decreased moisture uptake, and decreased interaction with polar substances. In addition, commercially available cellulose derivatives produced using the two-phase reaction chemistry are limited to ester derivatives with acyl substituents having less than four carbon atoms ($C_4$).

McCormick & Callais, *Polymer*, 28:2317–23 (1987) have proposed the acylation of cellulose in lithium chloride (LiCl)/N,N-dimethyl acetamide (DMAC) using acyl chlorides and acid anhydrides of small size (less than $C_3$). While acyl chlorides are highly reactive, they are collectively insoluble in the LiCl/DMAc solvent system, except for acetyl chloride. Homogenous phase reaction conditions are lost in reactions with propionyl or higher acyl chlorides.

Shimizu and Hayashi, *Cellulose Chemistry and Technology* 23, 667–670 (1989) reported cellulose esterification using p-toluenesulphonyl chloride (TsCl). Specifically, Shimizu et al. disclosed the production of tri-substituted cellulose esters from an acetylation reaction.

SUMMARY OF THE INVENTION

It is an object of this invention to provide cellulose derivatives that retain a large portion of the hydroxy (OH) functional groups in an unmodified stage.

It is another object of this invention to provide a cellulose derivatives that are modified by relatively large substituents ($C_{6-20}$ or larger).

It is yet another object of this invention to provide a cellulose derivative with a uniform degree of substitution along the polymer backbone.

According to the invention, cellulose derivatives are prepared using homogenous phase reactions wherein the cellulose is dissolved using DMAc/LiCl and a reagent system is added to promote the acylation of an appropriate acid anhydride or free carboxylic acid. One reagent system includes N,N-dicyclohexylcarbodiimide (DCC) and 4-pyrrolidinopyridine (PP). Another reagent system includes p-toluene sulfonyl chloride (TsCl) and pyridine (Py). The acylation product is recovered by precipitation from solvent, such as warm (60° C.) 50% aqueous methanol. The DCC/PP reagent system has been found to be very useful for the esterification of alkanoic acids of shorter chain length (i.e., ≦six carbon atoms ($C_6$)), and the TsCl/Py reagent system is efficient for the addition of acids having $C_{12}$ to $C_{20}$ alkyl chains. Stoichiometric control of the reagents allows for control of the degree of substition (DS). In addition, experiments demonstrate that the esterification is selective for the $C_2$ and $C_6$ positions.

DETAILED DESCRIPTION OF THE PREFERRED EMBODIMENTS OF THE INVENTION

Low degree of substitution cellulose derivatives are prepared by reacting the cellulose in the homogenous phase with a suitable carboxylic acid or anhydride and a reagent system selected from the group consisting of DCC/PP or TsCl/Py. The homogenous phase reaction produces a cellulose polymer with a large number of unsubstituted hydroxy groups uniformly distributed along the backbone of the cellulose, thus allowing the material to retain many favorable cellulose gel characteristics including moisture uptake, biodegradability, and interaction with ionic species. The invention allows the incorporation of large substituents on a cellulose backbone.

Recent developments in acylation chemistry involving small-molecule alcohols unrelated to cellulose have demonstrated the used of dicyclohexylcarbodiimide (DCC) as an esterification agent. DCC has been used as a condensation agent in the coupling of amines and carboxylic acides in peptied and protein chemistry. Scheme 1, presented in Hassner & Alexanian, *Tetrahedron Letters*, 4475 (1978), shows the use of DCC in condensation of carboxylic acids into anhydrides.

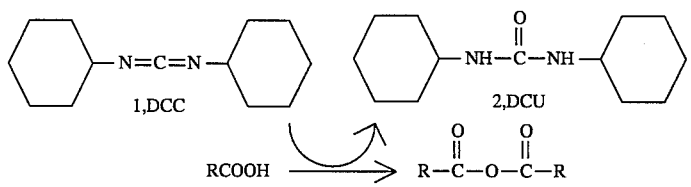

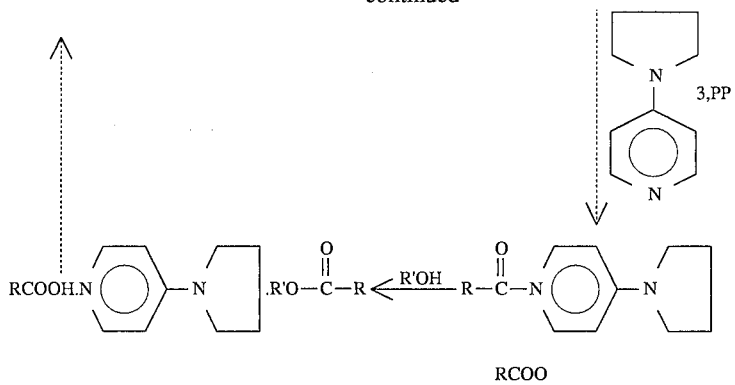

By recycling the spent half of the anhydride, its concentration in the medium is kept constant. 4-pyrrolidinopyridine (PP) converts the anhydride into a highly reactive species which reacts readily with an alcohol to yield an ester. The base is used only in catalytic amounts (e.g., 0.01 eq/OH).

One embodiment of this invention involves the addition of DCC to a cellulose solution together with an acid anhydride or free carboxylic acid that is to be esterified to the cellulose backbone. The cellulose solution can be made with any solvent system for cellulose which will maintain cellulose in the homogenous phase; however, best results have been obtained with a 10% or less solution in LiCl/DMAc. A 2% solution of cellulose in LiCl/DMAc can be prepared in accordance with McCormick and Dawsey, *Macromolecules*, 23:3606–10 (1990); however, this procedure can be advantageously be modified to avoid water during the initial step of cellulose activation by employing the solvent exchange of solid cellulose dried at 80° C. for 18 hrs. with methanol and then with DMAc followed by dissolution in DMAc/LiCl. PP in catalytic quantities (e.g., less than 0.1 eq./eq. of OH and preferably 0.01 eq/eq OH) is added to the cellulose solution which includes the DCC and acid anhydride or carboxylic acid. This solution is stirred for 48 hours at room temperature under an inert atmosphere. The acylation product is recovered by precipitation from warm (e.g., 60° C.) 50% aqueous methanol or other suitable reagent. The precipitate is then filtered under suction, washed with water and methanol, and then purified by soxhlet extraction with methanol for 24 hrs followed by diethyl ether for 24 hrs. The residue was dried under vacuum at 60° C. for 24 hr and stored in a desiccator at room temperature.

During the reaction, DCC is converted to N,N-dicyclohexyl urea (DCU). If the reaction mixture is precipitated into water, both DCC and DCU will precipitate along with the cellulose derivative. An excess acid derivative may also precipitate. After removing water, DCC and DCU can be recovered by washing with methanol. Residual acids can be separated from DCU/DCC by reprecipitation in water and washing the precipitate with dilute aqueous alkali. DCU is dried and dehydrated to DCC by heating with various dehydrating agents such as TsCl/pyridine, $POCl_3$, $PCl_5$, $P_2O_5$, etc.

Another embodiment of the invention involves the use of a p-toluenesulfonyl chloride or "tosyl chloride"/pyridine (TsCl/Py) system to esterify the cellulose polymer.

The procedure of Shimizu et al., *Cellulose Chemistry and Technology* 23, 667–670 (1989) was tested, but failed to produce an acceptable cellulose derivative. Instead a dark colored reaction mixture was formed which failed to yield the desired precipitate upon addition of a non-solvent. The sequence of steps for acids having six or more carbon atoms per alkyl substituent thereby involves (a) suspending solvent exchanged cellulosed in dimethyl formamide (DMF) (pyridine if the carboxylic acid has fewer than 6 C-atoms); (b) adding TsCl to this suspension (2 moles TsCl per cellulose OH equivalent); (c) adding free carboxylic acid (1, 2, or 4 moles per cellulose OH equivalent); (d) heating to 50° C. or higher for 20 hrs. The product in Shimizu was described as having a yellow or orange color. In homogenous phase, discoloration was experienced, and this was always associated with molecular degradation. In this reaction, TsCl is (a) present together with cellulose and neither a strong base (if the derivatizing acid is large and DMF is used as the solvent) nor a carboxylic acid, which is added subsequently (i.e., later); (b) any HCl or TsOH formed during the reaction of TsCl with any co-reagent is unbuffered and therefore capable of reducing cellulose molecular weight; and (c) the molar ratio of TsCl to carboxylic acid may exceed 1.0. After the addition of free carboxylic acid, any TsCl present will form a mixed anhydride which reacts freely with the OH groups of cellulose (heterogenous conditions). Free acids as large as C-4 (butyric acid) were reacted using pyridine as solvent but, acyl substituents having six or more carbon atoms were reacted using DMF as solvent and without base to buffer the strong acids produced during the reaction. Evidence of degradation to the starting polymer was observed and, the order of addition of reagents were cellulose in DMF, tosyl chloride, and free acid.

The failure to produce satisfactory cellulose ester products using the Shimizu process can be attributed to the following:

1. Shimizu and Hayashi process treats cellulose with TsCl in the absence of a strong base (e.g., pyridine) in the case of large substituents (i.e., six or more carbon atoms in the alkyl substituent);

2. Free carboxylic acid is added too late, after cellulose, TsCl, and DMF have been mixed (giving rise to color; and 3. The molar ratio of TsCl to carboxylic acid may exceed 1.0.

In the present invention, as discussed above, the cellulose is first dissolved into homogenous phase using a suitable reagent system such as LiCl/DMAc. Less than 10% LiCl/DMAc systems are prefered. Scheme 2 presents the reaction sequence for the second embodiment of the invention.

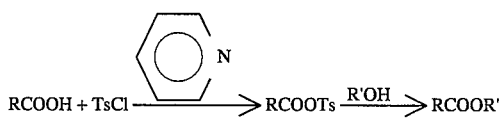

$$\text{RCOOH} + \text{TsCl} \xrightarrow{} \text{RCOOTs} \xrightarrow{\text{R'OH}} \text{RCOOR'}$$

TsCl and the carboxylic acid to be esterified to the cellulose backbone are first reacted together in pyridine. The tosylated reaction product is then reacted with the hydroxy moieties of the cellulose to produce an esterified cellulose derivative. Preferably the reaction vessel is warmed to 50° C. maintained at a warm temperature for 24 hrs throughout the reaction sequence. The reaction sequence shown in Scheme 2 has been found to prevent the major competing reactions of polymer degradation, chlorination or tosylation. The reactions are completed in 24 hrs without any molecular weight losses.

The reaction process used in this invention has the cellulose dissolved in DMAc/LiCl (homogenous conditions) and mixed with pyridine (3 moles per equivalent TsCl, before free carboxylic acid is added. At this stage, no TsCl is present in the reaction mixture. Only after free acid is added to the cellulose solution is TsCl added in equimolar amounts based on free acid, or less. Thus, the molar ratio of TsCl to AcOH is always 1.0 or less. This mixture is then heated to 40°–50° C. for 24 hours. The important difference here is that TsCl will not react with cellulose in the presence of, at minimum, equimolar carboxylic acid since the carboxyl groups consume TsCl for the formation of a mixed anhydride. This mixed anhydride, in the presence of nucleophilic cellulose OH groups, will form the target ester product with TsOH being displaced as a leaving group. TsOH leaves from the mixed anhydride because it is the weaker nucleophile compared to the cellulose OH groups; it remains in solution and is buffered by the pyridine. The formation of the mixed anhydride occasions the formation of HCl which is also absorbed by pyridine. Pyridine must be present, otherwise, HCl and toluenesulphonic acid, TsOH, would cause cellulose depolymerization. Thus, a key feature of the present invention is that in the homogenous phase reaction conditions, TsCl does not react with cellulose in the presence of sufficient free carboxylic acid and pyridine.

Several cellulose derivatives have been prepared using the DCC/PP and TsCl/Py reagent systems including propionates, buryrates, hexanoates, laurates, myristates, and stearates. It has been discovered that the DCC/PP reagent system is better for modification of the cellulose with smaller esters ($\leq C_6$), while the TsCl/Py reagent system is better for modification of the cellulose with larger esters (e.g., $C_{10-20}$). Excellent efficiency of the reactions is shown in Table 1 which presents the results of a stoichiometric control study in the preparation of cellulose hexanoates with DCC/PP and the preparation of cellulose laurates with TsCl/Py.

TABLE 1

| Cellulose Derivative | Reagents | Anhydride (eg/OH) | Acid (eg/OH) | DS |
|---|---|---|---|---|
| Hexanoate | DCC/PP | 0.125 | — | 0.06 |
| | | 0.25 | — | 0.1 |
| | | 0.5 | — | 0.4 |
| | | 0.5 | — | 0.5 |
| | | 1.0 | — | 0.9 |
| | | — | 0.33 | 0.15 |

TABLE 1-continued

| Cellulose Derivative | Reagents | Anhydride (eg/OH) | Acid (eg/OH) | DS |
|---|---|---|---|---|
| | | — | 0.7 | 0.43 |
| | | — | 1.0 | 1.0 |
| | | — | 2.0 | 2.1 |
| | | — | 3.0 | 2.5 |
| Laurate | TsCl/Py | 0.75 | — | 0.61 |
| | | 1.0 | — | 1.3 |
| | | 1.3 | — | 2.0 |
| | | 1.5 | — | 2.5 |
| | | 2.0 | — | 3.0 |

Characterization studies, including proton nuclear magnetic resonance (NMR) and fourier transform infrared (FTIR) confirmed the uniform degree of substitution on the cellulose derivative. The monomeric repeat unit of cellulose, anhydroglucose, possesses three hydroxy groups that differ in reactivity in accordance with intra- and intermolecular interactions and their particular electronic environment. Using proton-NMR, it was determined for a cellulose hexanoate of DS 0.5, there is an equal reactivity of OH groups in positions $C_6$ and $C_2$, and that both of these are three times as reactive as the OH group in position $C_3$.

No significant degradation of cellulose molecular weights were detected using either reaction methods as evidenced by gel permeation chromatography. The molecular weights of several cellulose derivatives varied between a degree of polymerization ($DP_n$) between 150 and 200 regardless of the substituent type as shown in Table 2.

TABLE 2

| Molecular weights of Selected Cellulose Derivatives | | |
|---|---|---|
| Cellulose Derivative | DS | $DP_n$ |
| Cellulose (Whatman CF-11) | 0 | 191 |
| Propionate | 1.6 | 190 |
| Hexanoate | 0.9 | 157 |
| | 2.1 | 206 |
| | 2.5 | 208 |
| Myristate | 0.5 | 208 |
| Stearate | 0.4 | 179 |

The invention has particular application in making cellulose based materials used for chromatography, water purification and gas purification. In particular, the cellulose materials can have functional groups esterified to the cellulose backbone which will be useful for affinity separation and ion exchange purposes.

Another application contemplated by this invention is the production of medical implants and drug delivery vehicles. In particular, by attaching antibodies, drugs, and other active compounds to the cellulose backbone through an ester linkage, the esterases present in the human or animal body will release the active substance from the cellulose through enzymatic action.

A further application of the technology is to produce cellulose materials that have a lower melting point than the degradation temperature. By esterifying cellulose backbone, the melting point is lowered to produce a material with a plasticity that allows melt processing. Hence, the esterified cellulose could be used as a substitute for cotton and other materials.

EXAMPLE 1

DCC (1 eq./acid anhydride or 1 eq./acid) is added to cellulose solution in DMAc/LiCl followed by the addition of an acid anhydride or a free carboxylic acid. Good results have been achieved with Whatmann CF-11 cellulose having a degree of polymerization (DP) equal to 190, and using solutions of cellulose in 9% lithium chloride (LiCl)/N,N-dimethyl acetamide (DMAc) as described in McCormick and Dawsey, *Macromolecules*, 23:3606–10 (1990) which is herein incorporated by reference). A catalytic amount of 4-pyrrolidinopyridine (PP) is added to the solution. For example, rather than using base catalyst in quantities equimolar to the anhydride, the PP can be used in amounts less than 0.1 eq/OH. Good results have been achieved with PP provided in amounts of 0.01 eq/OH. The solution is stirred for 48 hours at room temperature under an inert atmosphere. The acylation product is recovered by precipitation from warm (60° C.) 50% aqueous methanol. The precipitate is washed thoroughly with water and then with methanol, and then soxhlet extracted with methanol for 24 hrs. Further soxhlet extraction with diethyl ether for 24 hrs may also be employed.

EXAMPLE 2

A 6% solution of cellulose (242 g, 1.5 moles) in 9% LiCl/DMAc (8 L) was prepared in a stirred glass reactor. A DMAc (310 mL) solution of DCC (455 g, 1.86 moles/ Anhydoglucose (AHG) unit) and solid PP (69 g) was added to the stirred solution at room temperature. Hexanoic anhydride (520 mL, 2.2 eq./AHG unit) was added slowly and the resulting clear solution was stirred an additional 48 hrs. The product was recovered by precipitation into 50% methanol/ $H_2O$ (15 L). The residue was purified as in Example 1 to produce 249 g of material with a degree of substitution of 0.89.

EXAMPLE 3

50 ml of cellulose solution (4% in 9% LiCl/DMAc) is diluted with 50 mL dry DMAc under nitrogen atmosphere. Pyridine (6 eq./OH) was added and then a solution of the carboxylic acid ($C_{10-20}$) in DMAc (30–160 mL depending on the solubility of the acid) is added slowly. The resulting solution is stirred for 15 min and then a DMAc (30–50 mL) solution of tosyl chloride (1 ea./acid) is added to solution. The reaction occurs by raising the temperature to 60° C. and maintaining the temperature for 24 hr. The products are recovered by precipitation into 50% isopropanol/$H_2O$. The precipitates are further purified by soxhlet extractions with methanol and/or hexane, and ditheyl ether.

EXAMPLE 4

Solvent exchanged cellulose (100 g) is dissolved in 9% LiCl/DMAc to make a 1.5% solution. Pyridine (449 mL, 3 eq./OH) is added to the solution, followed by the addition of a DMAc (1000 mL) solution of lauric acid (1 eq./OH, 370 g). The cellulose solution is kept agitated using a stirrer assembly in a 12 L glass reactor (available from ACE Glass) under a nitrogen atmospher. A solution of tosyl chloride (327 g) in DMAc (1000 mL) is added slowly and then the reaction mixture is warmed to 50° C. and maintained at that temperature for 24 hrs. The reaction is stopped by pouring the solution into 20 L of 50% isopropanol/$H_2O$. The precipitate is purified as described above. The reaction has yielded 150 g of product with a degree of substitution of 1.3.

While the invention has been described in terms of its preferred embodiments, those skilled in the art will recognize that the invention can be practiced with modification within the spirit and scope of the appended claims.

We claim:
1. A method for forming cellulose derivatives, comprising:
   creating a homogenous phase solution of cellulose, dicyclohexylcarbodiimide, and a carboxylic acid or acid anhydride to be esterified to said cellulose;
   forming a cellulose derivative which comprises said carboxylic acid or acid anhydride esterified to said cellulose, the degree of modification of said cellulose being uniform throughout its length; and
   recovering said cellulose derivative.
2. The method of claim 1 further comprising the step of controlling the degree of substitution on said cellulose derivative by selecting the stoichiometric relationship between the moles of hydroxy units on said cellulose and the moles of said carboxylic acid or acid anhydride used in said creating step.
3. A method for forming cellulose derivatives, comprising the steps of:
   reacting, in pyridine, toluene sulfonyl chloride with a carboxylic acid compound to be esterified to cellulose, to produce a reaction product;
   adding said reaction product to a homogenous phase solution of cellulose; and
   forming a cellulose derivative having said carboxlic acid compound esterified to said cellulose.
4. The method of claim 3 further comprising the step of heating a reaction vessel containing said homogeous phase solution of cellulose to a temperature of greater than 40° C.
5. A method of forming cellulose derivatives, comprising the steps of:
   combining, within a homogenous phase solution of cellulose,
   (i) a compound capable of absorbing or forming an adduct with HCl, and
   (ii) a compound with a carboxylic acid moiety to form a mixture; then
      adding to said mixture toluene sulfonyl chloride in equimolar amounts or less to said carboxylic acid moiety;
      reacting said compounds and said toluene sulfonyl chloride in said mixture to produce a cellulose ester derivative that includes said compound with said carboxylic acid moiety bonded through an ester linkage to said cellulose; and
   recovering said cellulose derivative from said homogenous phase solution of cellulose.
6. The method of claim 5 wherein said reacting step is performed at temperatures ranging from 40° C. to 50° C.
7. The method of claim 1, wherein said creating of said homogenous phase comprises dissolving said cellulose in a solvent effective to maintain said cellulose in a homogenous phase, and then admixing thereto said dicyclohexylcarbodiimide and said carboxylic acid or acid anhydride.
8. The method of claim 7, wherein said solvent comprises lithium chloride and N,N-dimethyl acetamide.
9. The method of claim 1, wherein said carboxylic acid or acid anhydride comprises an alkanoic acid having a chain length comprising 1 to 6 carbon atoms.
10. The method of claim 1, wherein said forming of said cellulose derivative comprises a homogenous phase reaction.
11. The method of claim 1, further comprising adding a catalytically effective amount of pyrrolidinopyridine to said homogenous phase after said creating of said homogenous phase solution and before said forming of said cellulose derivative.

12. The method of claim 11, wherein said catalytically effective amount of pyrrolidinopyridine comprises a non-zero amount less than 0.1 eq./eq. OH.

13. The method of claim 1, wherein said cellulose derivative has a degree of polymerization ($DP_n$) between 150 and 200.

14. The method of claim 1, wherein said cellulose derivative has a degree of substitution in the range from 0.06 to 2.5.

15. The method of claim 5, wherein said compound with a carboxylic acid moiety comprises a carboxylic acid having a $C_{10}$ to $C_{20}$ alkyl chain.

16. The method of claim 5, wherein said compound capable of absorbing or forming an adduct with HCl comprises pyridine.

17. The method of claim 5, wherein said homogenous phase solution of cellulose is prepared by dissolving said cellulose in a solvent effective to maintain said cellulose in a homogenous phase.

18. The method of claim 17, wherein said solvent comprises lithium chloride and N,N-dimethyl acetamide.

19. The method of claim 5, wherein said cellulose derivative has a degree of polymerization ($DP_n$) between 150 and 200.

20. The method of claim 5, wherein said cellulose derivative has a degree of substitution in the range from 0.61 to 2.5.

* * * * *